(12) United States Patent
Allain

(10) Patent No.: US 6,168,512 B1
(45) Date of Patent: Jan. 2, 2001

(54) APPARATUS FOR CONVEYING AND POSITIONING SHRIMP

(75) Inventor: Reid Allain, Jasper, GA (US)

(73) Assignee: Ocean Tech International, Inc., Jasper, GA (US)

(*) Notice: Under 35 U.S.C. 154(b), the term of this patent shall be extended for 0 days.

(21) Appl. No.: 09/336,579

(22) Filed: Jun. 21, 1999

(51) Int. Cl.⁷ .................................................. A22C 29/02
(52) U.S. Cl. ............................ 452/179; 452/2; 452/180
(58) Field of Search .................................. 452/179, 177, 452/180, 1, 2

(56) References Cited

U.S. PATENT DOCUMENTS

| | | |
|---|---|---|
| 1,677,579 | 7/1928 | Barry . |
| 2,781,544 | 2/1957 | Skrmetta ............................ 17/2 |
| 2,818,598 | 1/1958 | Skrmetta ............................ 17/9 |
| 2,976,564 | 3/1961 | Skrmetta ............................ 17/2 |
| 3,024,490 | 3/1962 | Skrmetta ............................ 17/2 |
| 3,031,714 | 5/1962 | Skrmetta et al. .................... 17/2 |
| 3,070,833 | 1/1963 | Skrmetta ............................ 17/45 |
| 3,383,734 | 5/1968 | Lapeyre ............................. 17/2 |
| 3,414,934 | 12/1968 | Skrmetta et al. .................... 17/2 |
| 3,696,466 | 10/1972 | Letchworth ......................... 17/71 |
| 3,784,007 | 1/1974 | Skrmetta .......................... 209/85 |
| 3,816,877 | 6/1974 | Bullock ............................ 17/73 |
| 3,897,610 | 8/1975 | Lapeyre ............................. 17/71 |
| 3,932,914 | 1/1976 | Lapeyre ............................. 17/71 |
| 4,016,625 | 4/1977 | Mitchell ........................... 17/71 |
| 4,531,261 | 7/1985 | Sanaka ............................. 17/71 |
| 4,692,965 | 9/1987 | Stephenson ........................ 17/48 |
| 4,916,776 | 4/1990 | Allain ............................. 17/71 |
| 4,941,233 | 7/1990 | Allain ............................. 17/71 |
| 5,405,287 | 4/1995 | Allain ............................. 452/4 |
| 5,762,547 | 6/1998 | Allain ........................... 452/179 |

FOREIGN PATENT DOCUMENTS 3535035   4/1984  (DE) ................................... 1/12

Primary Examiner—Willis Little
(74) Attorney, Agent, or Firm—Kennedy, Davis & Hodge, LLP

(57) ABSTRACT

A shrimp conveying and positioning apparatus (10) includes a track (13) oriented along an inclined path in one direction. The track is reciprocated along an inclined path in a direction opposite to the inclined orientation of the track. The apparatus also includes a contact plate (26) wherein the shrimp ride upon the contact plate to position the shrimp from a vertical orientation to a horizontal orientation.

14 Claims, 3 Drawing Sheets

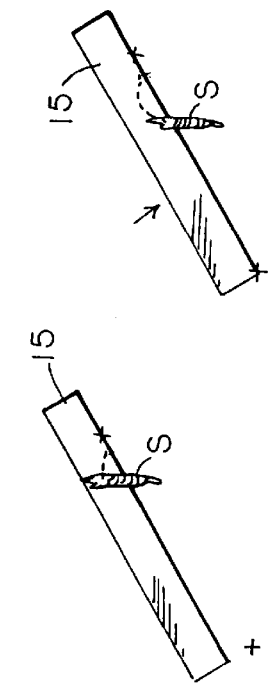
FIG. 4
FIG. 5
FIG. 6
FIG. 7
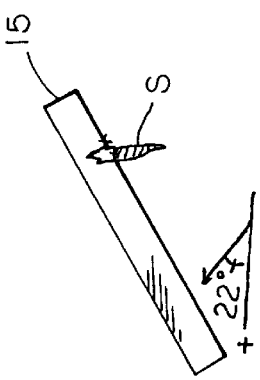
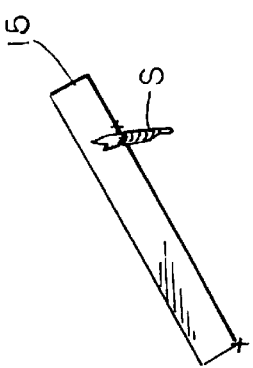
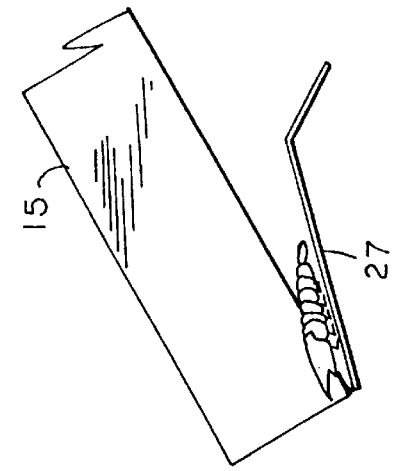
FIG. 8
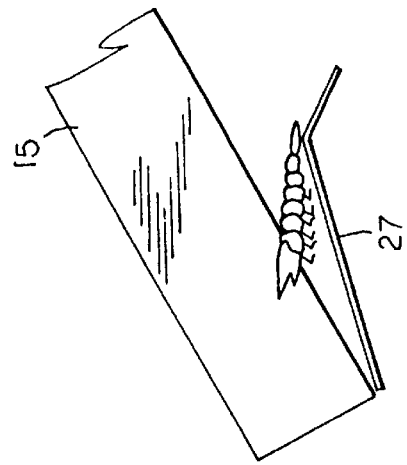
FIG. 9
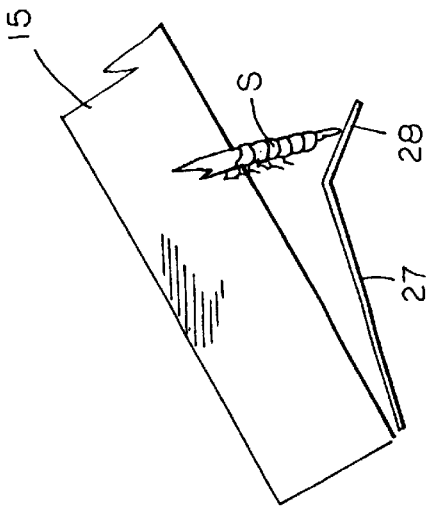
FIG. 10

APPARATUS FOR CONVEYING AND POSITIONING SHRIMP

TECHNICAL FIELD

This invention relates to apparatuses for conveying and positioning crustaceans, and more particularly to apparatuses for conveying and positioning shrimp on an automated basis.

BACKGROUND OF THE INVENTION

Once shrimp are caught and removed from water they must be deheaded within a relatively short period of time or frozen whole to delay the decaying action of bacteria within the head. Heretofore, shrimp have been deheaded by manually pulling the head from the body of the shrimp. This process however is labor intensive and time consuming.

Automated apparatuses have been designed for deheading shrimp as shown in U.S. Pat. No. 4,692,965. These apparatuses dehead shrimp by bending the shrimp quickly around an edge as they move from a vertical flow of slow moving fluid to a horizontal flow of fast moving fluid. However, because the orientation of the shrimp is not consistent, as well as other variables involving the force required to dehead shrimp, these apparatuses do not consistently dehead the shrimp. Furthermore, the separated heads and bodies of the shrimp are conveyed within one stream of fluid, thus requiring further separation of these portions.

Shrimp deheading apparatuses have also been designed which have a blade which severs the head from the body, as shown in U.S. Pat. No. 4,016,625. However, due to differences in the size of shrimp these apparatuses sometimes sever within the head thus causing portions of the head to remain attached to the body. Conversely, the shrimp are sometimes severed within the body thus causing a portion of the body meat of the shrimp to remain attached to the head and therefore wasted. Also, even when a shrimp is severed between the head plate and the first thoracic plate, a portion of the body meat which extends beneath the head plate is severed from the body and discarded with the head, thereby causing inefficiencies and increases in the overall cost of processed shrimp.

Another problem associated with existing types of deheading apparatuses is that the shrimp must be oriented with the head in a particular position prior to the blade contacting the shrimp. This problem has proved to be difficult to solve on an automated basis and thus has been accomplished by manual aid.

Shrimp deheading apparatuses have also been designed which remove the head by "pinching" it from the body, as shown in U.S. Pat. No. 4,941,233. A problem however occurs with the proper positioning of the shrimp immediately prior to the pinching action. Oftentimes, differences in the natural curvature of shrimp causes shrimp to be oriented at different angles as they are pinched between a deheading finger and a deheading block. It has been found that a consistent positioning of the shrimp is an important factor in properly removing the head.

Yet another problem associated with the processing of shrimp has been the efficiency of movement. As shown in the previously referenced prior art, shrimp have been moved in mass by simply entraining the shrimp within a stream of water. This method however does not enable the shrimp to be processed until they are separated.

Heretofore, Applicant devised an apparatus for moving shrimp along a trough, as shown in U.S. Pat. No. 5,762,547. This apparatus moves shrimp by reciprocating the trough horizontally at a very rapid cyclical rate, approximately 1,700 cycles per minute, so as to cause the shrimp to vibrate downwardly along the trough. It has been found however that this rapid motion may cause segments to separate. For example, the head may separate from the body thereby causing the shrimp to fall through the trough prior to reaching the deheading station. This premature deheading of the shrimp reduces the efficiency of the process as the shrimp bodies are either lost with the waste material or must be manually separated from the waste material.

Accordingly, it is seen that a need has long existed for apparatuses for conveying and positioning shrimp in a commercially efficient and effective manner. It is to the provision of such apparatuses therefore that the present invention is primarily directed.

SUMMARY OF THE INVENTION

In a preferred form of the invention an apparatus for conveying shrimp for in line processing comprises a trough oriented along a slope that is inclined in one direction. Means are provided for reciprocating the trough along a slope that is inclined in a direction opposite the inclined direction of the trough. With this construction shrimp may be conveyed down the trough at a relatively slow trough cycling rate.

BRIEF DESCRIPTION OF THE DRAWING

FIGS. 4–7 provide a sequence of side views of the trough of the apparatus of FIG. 1, which show cyclic movement of the trough and the accompanying movement of a shrimp thereon.

FIGS. 8–10 provide a sequence of side views showing the trough and contact plate of the apparatus of FIG. 1, which show in sequence, the actuation of the trough and contact plate and the positioning movement of a shrimp thereon.

DETAILED DESCRIPTION

Figure 11:
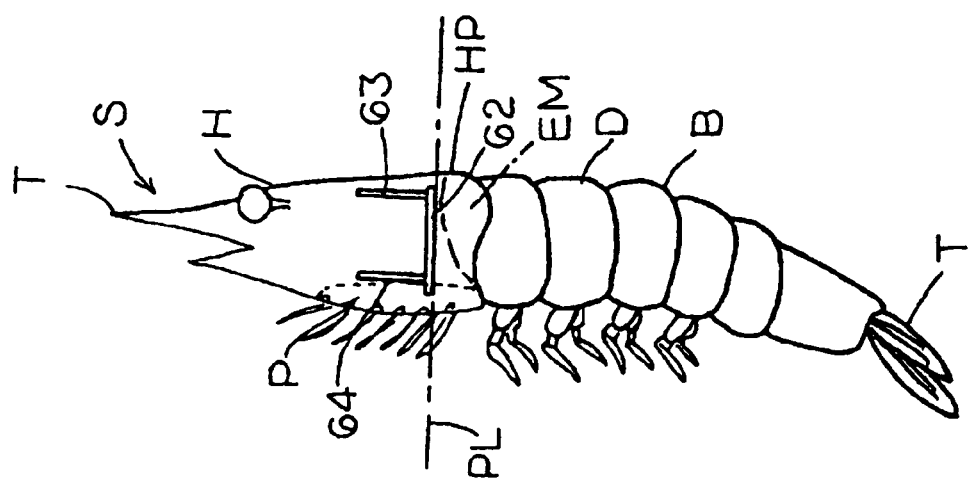
FIG. 11 is a side view of a shrimp identifying body elements thereof and the positioning of the deheading blades against the shrimp.

With reference next to the drawing, there is shown an apparatus 10 which conveys shrimp S, having a head H, a tail T, a body B extending between the head and tail. The apparatus also positions shrimp for use in conjunction with a deheading apparatus which separates the shrimp heads H from their bodies B in a manner so as to capture the extra meat EM extending beneath the head plate HP of the shrimp head, as best shown in FIG. 11.

The apparatus 10 has a track 13 terminating at a deheading station 14. The track 13 has multiple pairs of inverted V-shaped rails or troughs 15 defining V-shaped channels 16 therebetween. The rails of the track are separated by a space or gap 21 which tapers outwardly towards the lower end of the track.

The track is mounted to a moveable inner frame 22 at an inclined angled extending upwardly and to the right with reference to the drawings. The inner frame is coupled to a stationary outer frame 23 by two semi-flexible spring plates 26 extending between the inner frame 22 and the outer frame 23. A pneumatic cylinder 24, oriented at an angle of approximately 15° to horizontal, is mounted between the inner frame 22 and the outer frame 23 for reciprocal movement of the inner frame and track back and forth in an upward and forwardly direction with reference to the drawings. Thus, the movement is along a path that is inclined in the opposite direction to the inclined path of the track. A resilient stop 25 is mounted to the outer frame 23 at a distance from the inner frame 22 to cause an abrupt halt of the inner frame as it reciprocates towards the deheading station and initiate an immediate return movement of the frame away from the deheading station. Much of the construction and design of the tracks, inner frame, outer frame, and the means for reciprocal movement of the inner frame are described in detail in U.S. Pat. Nos. 4,916,776 and 5,405,287.

A contact plate 26 is mounted to the inner frame 22 in a position below the space 21 between the rails. The contact plate 26 has an elongated portion 27 extending at a diverging angle from the lowermost end of the rails and a leading portion 28 set at an angle to the elongated portion 27 so as to extend downwardly.

The deheading station 14, shown with the supporting frame removed for clarity, has rails 50 aligned with the rails 15 of the track. Here again, the rails 50 are shaped to define a V-shaped channel, similar to that shown in FIG. 2 except that it has an additional bottom floor 52. The deheading station also has a stop bar 54 and multiple pairs of elongated severing fingers 55. The severing fingers are coupled to a pneumatic cylinder 58 which causes the fingers to move in opposite directions, as indicated by the arrows in FIG. 3, to bring the fingers 55 towards and away from each other. Each severing finger 55 has a vertical blade 62, a top horizontal blade 63 and a bottom horizontal blade 64. A pneumatic cylinder 61 is coupled to the stop bar 54 and finger actuation bars 56 and 57 for reciprocal, pivotal movement thereof between a severing position adjacent the track and a releasing position distal the track. With the severing fingers 55 in their severing positions, the vertical blades 62 of corresponding severing fingers overlap each other by approximately ⅛ inch and the horizontal blades 63 and 64 of corresponding fingers are separated from each other by approximately 1/16 inch.

Figure 1:
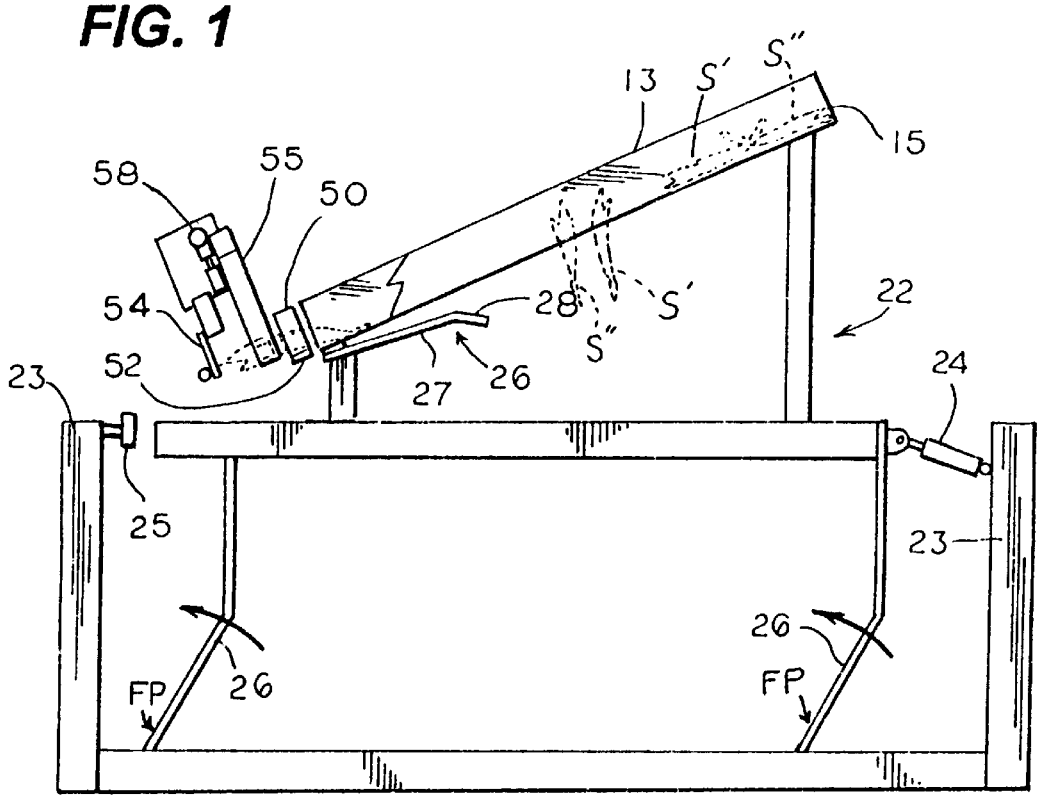
FIG. 1 is a side view of shrimp moving and positioning apparatus embodying principles of the invention in a preferred form.
Figure 2:
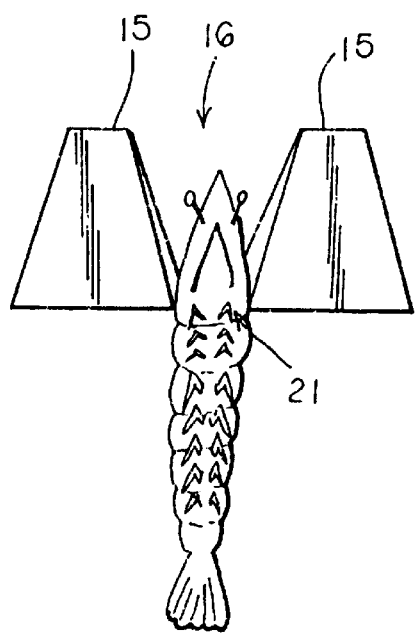
FIG. 2 is an end view of a trough portion of the apparatus of FIG. 1 showing a shrimp thereon.
Figure 3:
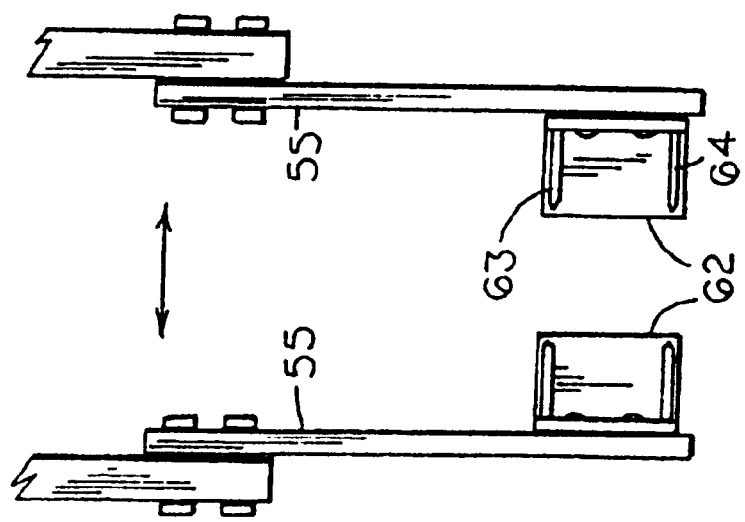
FIG. 3 is an end view of the severing fingers of the apparatus of FIG. 1.

In use, shrimp enter the upper end of track 13 in four possible initial positions: head H forward dorsal side D up, head H forward dorsal side D down, tail T forward dorsal side D up, and tail T forward dorsal side D down, and in to two possible end positions for deheading: head forward dorsal side up and head forward dorsal side down. Referring to FIG. 1, there is shown a shrimp S' starting down the track 13 in a head forward position and another shrimp S" on the track in a tail forward position. Through reciprocal movement of the inner frame, as described in more detail hereinafter, the shrimps travel down the track 13 until their tails T and a majority of their bodies B pass down through the space 21 between the rails so that the shrimps are oriented in a generally vertical orientation with their head H and possibly small, uppermost body portions B supported upon the rails. This is best shown in FIG. 2.

Actuation of the inclined pneumatic cylinder 24 causes the inner frame and tracks to move forwardly and upwardly. The forward and upward movement of the frame is controlled by the flex of the spring plates 26 along a flex point FP, as shown by the arrows in FIG. 1, which causes the inner frame and tracks to move upwardly and forwardly at approximately 22° to the horizontal. It is believed that an angular movement of less than 5° to the horizontal would not be enough to cause sufficient upward movement of the shrimp, while an angular deflection of more than 30° would cause to great a vertical movement of the shrimp along the tracks resulting in damage to the shrimp. The inner frame is moved forwardly until it contacts stops 25, which cause the inner frame to stop abruptly. Simultaneously with the abrupt halting of the frame, the pneumatic cylinder is actuated in a reverse direction to cause the frame and tracks to return to their initial position. The frame and track move in a rearward direction at a substantially higher velocity than their forward movement because of the force required to load the spring in the forward direction and the additional spring biasing force upon the frame and track provided by the unloading of the spring plates in the reverse direction.

With the shrimps traveling down the tracks in a forward direction they are provided with a forward inertial force. The abrupt stopping of the track, in combination with the following rapid reversal of direction of the tracks in the rearward direction, causes the shrimp to loose frictional contact with the track and to inertially continue along an upward and forwardly path of travel as the track returns to its initial position. The shrimp gravitationally falls back onto the track at a location further down and to the left, as shown in FIGS. 4–7. As such, the movement of the tracks cause the shrimp to "hop" down the inclined slope of the tracks. It is believed that the hopping movement of the shrimp causes less damage than the rapid vibrating motion of the track associated with apparatuses of the prior art which causes the segmented portions of a shrimp to separate.

With continued movement of the shrimps down the rails the shrimps comes into contact with the leading portion 28 of the contact plate 26. The forward movement of the shrimps through the reciprocal movement of the tracks here causes the shrimps to ride upon the contact plate elongated portion 27, which, because of its angle with respect to the track, causes the shrimps to rotate to a generally horizontal orientation as they approach the end of the track as shown in FIGS. 8–10.

The shrimp S then continue to travel down the rails with this hopping action to the deheading station wherein the tips TP of the shrimp heads abut the stop bar 54 with the majority of the shrimp body resting upon the rails of the track. Once the shrimp are positioned at the deheading station the severing fingers 55 are moved together by actuation of pneumatic cylinder 58, thus causing the vertical blades 62 to sever the shrimp head H and the horizontal blades 63 and 64 to enter the shrimp head along the connection of the pleopod section P. The severing fingers and stop bar are then pivoted to their releasing position by actuation of pneumatic cylinder 61, thereby removing the head H from the body B of the shrimp. It should be understood that this exact positioning of the shrimps allow the blades to be positioned precisely along the sides of the head H so as to sever the head H along a plane PL extending through the heads H in advance of the shrimp extra body meat EM extending beneath the head plate HP. Hence, the extra body meat EM is severed from the head H and extracted from beneath the head plate HP as a continuation of the body B. A stream of fluid is directed by nozzles 66 to wash the severed head from the severing fingers and into an unshown collection trough.

The contact position of the vertical blades 62 against the shrimp may be adjusted to accommodate shrimp of different size groups. This is done by simply moving the stop bar to different distances relative to the severing fingers. For example, for large shrimp the stop bar is moved distally from the severing fingers, while with small shrimp the stop bar is positioned close to the severing fingers. Also, the contact position of the horizontal blades 63 and 64 may be adjusted in the vertical direction.

It should be understood that the apparatus may include multiple troughs. In that case, the shrimp must reach the deheading station 14 simultaneously to optimize production. To accomplish this the apparatus may include mechanical elements shown in U.S. Pat. No. 5,762,547, which include stopping station fingers and a plate extending across the top of the V-shaped channel to prevent the shrimp from naturally curling while it contacts the fingers. The stopping fingers are pivoted to allow the simultaneous passage of shrimp within each trough.

It thus is seen that an apparatus is now provided for moving and positioning shrimp on an automated basis which overcomes problems long associated with those of the prior art. It should however be understood that the just described embodiment merely illustrates principles of the invention in its preferred form. Many modifications, additions and deletions may, of course, be made thereto without departure from the spirit and scope of the invention as set forth in the following claims.

What is claimed is:

1. Apparatus for conveying shrimp for in line processing comprising a trough oriented along a slope that is inclined in one direction, said trough having two supporting surfaces separated from each other by a space, and wherein said supporting surfaces are sized and shaped to contact the head or an upper portion of the body of the shrimp with the remaining portions of the shrimp depending from said trough through said space, and wherein said apparatus further comprising an elongated contact plate positioned below said space of said trough, said contact plate being oriented at a converging angle towards a lower portion of said trough, and means for reciprocating said trough along a slope that is inclined in a direction opposite said one direction, whereby shrimp are conveyed down the trough with a hopping motion at a relatively slow trough cycle rate and the contact plate moves the shrimp from a generally vertical orientation towards a generally horizontal orientation as the shrimp move to the lower portion of the trough.

2. The apparatus of claim 1 wherein said contact plate has a leading portion and a trailing portion extending from said leading portion, and wherein said leading portion is oriented at an angle to said trailing portion.

3. The apparatus of claim 1 wherein said contact plate is also coupled to said reciprocating means for reciprocal movement along with the reciprocal movement of said trough.

4. Apparatus for moving shrimp having a head, a tail, and a body extending between the head and the tail, the apparatus comprising:

a trough having two opposite, inwardly facing shrimp supporting surfaces sloping downwardly towards each other and having a space therebetween sized and shaped so that said trough contacts the head or an upper portion of the body of the shrimp with the remaining portions of the shrimp depending in a generally vertical orientation from the trough, said trough being oriented along a path of positive slope;

reciprocating means for imparting reciprocal movement of said trough to cause movement of the shrimp along the trough in a longitudinal direction, an elongated contact plate positioned below said space of said trough, said contact plate being oriented at a converging angle towards a lower portion of said trough, whereby the contact plate moves the shrimp from a generally vertical orientation to a generally horizontal orientation as the shrimp moves towards the lower portion of the trough.

5. The apparatus of claim 4 wherein said contact plate has a leading portion and a trailing portion extending from said leading portion, and wherein said leading portion is oriented at an angle to said trailing portion.

6. The apparatus of claim 4 wherein said contact plate is also coupled to said reciprocating means for reciprocal movement along with the reciprocal movement of said trough.

7. The apparatus of claim 4 wherein said trough is inclined in one direction and wherein said reciprocating means reciprocates said trough along a path inclined in a direction opposite to said one direction.

8. The apparatus of claim 7 wherein said reciprocating means reciprocates said trough along a slope within a range of between 5 degrees and 30 degrees with respect to the horizontal plane.

9. The apparatus of claim 8 wherein said reciprocating means reciprocates said trough along a slope of approximately 22 degrees with respect to the horizontal plane.

10. The apparatus of claim 4 wherein said reciprocating means moves said trough in a rearward direction at a substantially greater velocity than the movement of the trough in a forward direction.

11. The apparatus of claim 10 wherein said reciprocating means includes at least one spring plate coupling said trough to a frame, wherein the forward movement of said trough biasably loads said spring plate and wherein the rearward movement of said trough is assisted by the biasing force of said spring plate.

12. Apparatus for moving shrimp having a head, a tail, and a body extending between the head and the tail, the apparatus comprising:

a trough having shrimp supporting surfaces; separated from each other by a space and wherein said supporting surfaces are sized and shaped to contact the head or an upper portion of the body of the shrimp with the remaining portions of the shrimp depending from said trough through said space;

a reciprocating means for reciprocating said trough in generally forward and rearward directions, said reciprocating means moving said trough in the rearward direction at a substantially greater velocity than the movement of the trough in a forward direction; and an elongated contact plate positioned below said space of said trough, said contact plate being oriented at a conveying angle towards a lower portion of said trough, whereby the contact plate moves the shrimp from a generally vertical orientation towards a generally horizontal orientation has the shrimp move to the lower portion of the trough with the velocity of the trough in the forward direction causing an inertial force upon the shrimp that overcomes the frictional contact between the shrimp and the trough as the trough is moved at a higher velocity in the rearward direction.

13. The apparatus of claim 12 wherein said contact plate has a leading portion and a trailing portion extending from said leading portion, and wherein said leading portion is oriented at an angle to said trailing portion.

14. The apparatus of claim 12 wherein said contact plate is also coupled to said reciprocating means for reciprocal movement along with the reciprocal movement of said trough.

* * * * *